(12) United States Patent
Ma et al.

(10) Patent No.: US 6,687,201 B2
(45) Date of Patent: Feb. 3, 2004

(54) APPARATUS FOR GENERATING SEEK DIRECTION DETECTION SIGNAL

(75) Inventors: Byung-in Ma, Suwon (KR); Chong-sam Chung, Suwon (KR); In-sik Park, Suwon (KR); Byoung-ho Choi, Suwon (KR); Tae-yong Doh, Suwon (KR); Jin-hoon Jeon, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 440 days.

(21) Appl. No.: 09/846,264

(22) Filed: May 2, 2001

(65) Prior Publication Data

US 2002/0006088 A1 Jan. 17, 2002

(30) Foreign Application Priority Data

May 29, 2000 (KR) ......................................... 2000-28990

(51) Int. Cl.$^7$ ................................................. G11B 7/00
(52) U.S. Cl. .................. 369/44.28; 369/53.28
(58) Field of Search ........................ 369/44.25, 44.37, 369/44.41, 44.28, 44.27, 53.28, 53.29, 53.39, 53.43, 124.03

(56) References Cited

U.S. PATENT DOCUMENTS

| 5,138,594 A | * | 8/1992 | Fennema et al. | ........ 369/44.29 |
| 5,289,447 A | * | 2/1994 | Kobayashi et al. | ...... 369/44.28 |
| 5,844,871 A | * | 12/1998 | Maezawa | .................. 369/44.28 |

* cited by examiner

*Primary Examiner*—Paul W. Huber
(74) *Attorney, Agent, or Firm*—Staas & Halsey LLP

(57) ABSTRACT

An apparatus for use in an optical disc includes an optical disc and an optical branching unit irradiating a main light beam and a sub-light beam, wherein the sub-light beam includes a optical aberration in a direction on a track of the optical disc. The apparatus further includes a photodetector including a plurality of portions receiving and processing the main light beam and a plurality of portions receiving and processing the sub-light beam. A track error signal detector detects a track error signal from the portions receiving the main light beam. A track cross signal detector detects a track cross signal from the portions receiving the main light beam and from the portions receiving the sub-light beam. A signal processor further compares the track error signal with the track cross signal to detect the seek direction of a light spot formed on the optical disc.

32 Claims, 13 Drawing Sheets

WHEN RADIAL TILT IS 0°, AND LIGHT SPOT
MOVES TO OUTER SIDE OF OPTICAL DISC

WHEN RADIAL TILT IS 0°, AND LIGHT SPOT
MOVES TO OUTER SIDE OF OPTICAL DISC

WHEN RADIAL TILT IS 0°, AND LIGHT SPOT
MOVES TO INNER SIDE OF OPTICAL DISC

WHEN RADIAL TILT IS 0.25°

WHEN RADIAL TILT IS 0.25°

WHEN RADIAL TILT IS −0.5°

WHEN RADIAL TILT IS −0.5°

APPARATUS FOR GENERATING SEEK DIRECTION DETECTION SIGNAL

CROSS-REFERENCE TO RELATED APPLICATION

This application is based upon and claims priority of Korean Patent Application No. 00-28990 filed May 29, 2000 in the Korean Industrial Property Office, the contents being incorporated herein by reference.

BACKGROUND OF THE INVENTION

1. Field of the Invention

The present invention relates to an optical pickup for an optical disc with a land and groove structure, and more particularly, to an apparatus generating a seek direction detection signal, irradiating a main light beam and a sub-light beam having a predetermined optical aberration on a certain track of the optical disc, and detecting the seek direction of a light spot formed on the optical disc and the relative positions of the center of the light spot and the center of the certain track on the optical disc with respect to each other.

2. Description of the Related Art

Generally, an optical pickup optically records information on or reproduces information from an optical disc such as a recordable and reproducible RAM type optical disc having a land and groove structure. Such an optical pickup includes a light source emitting a laser light beam, an objective lens focusing the light beam emitted from the light source on an optical disc, thereby allowing a light spot to be formed on the optical disc, a photodetector receiving light reflected from the optical disc and detecting an information signal and an error signal, and a signal processor processing the detected signals.

A conventional apparatus for generating a seek direction detection signal for a light spot formed on an optical disc by an optical pickup, as shown in FIGS. 1 and 2, includes a grating (not shown) for diffracting and branching a light beam radiated from a light source to simultaneously irradiate light beams on a track which information is recorded on or reproduced from and an adjacent track, an photodetector and a signal processor.

Referring to FIG. 1, lands and grooves are alternately formed throughout a RAM type optical disc 1 and signal marks 1a are formed on the lands and grooves. When information is recorded on or reproduced from the optical disc 1, light branched by the grating forms a spot on the optical disc 1. Specifically, a main light beam $B_m$ forms a spot on a track for recording or reproducing information signal mark 1a, and a first or second sub light beam $B_{s1}$ and $B_{s2}$ leading or following the main light beam $B_m$ by a predetermined phase angle forms a spot on the optical disc 1, the center of the spot being displaced from the center of the spot of the main light beam $B_m$ by ±½ track pitch in the radial direction of the optical disc 1 with respect to the main light beam $B_m$.

Referring to FIG. 2, the photodetector includes a main photodetector 2a for receiving the main light beam $B_m$ reflected from the optical disc and first and second sub-photodetectors 2b and 2c receiving the first and second light beams $B_{s1}$ and $B_{s2}$, respectively. Here, the main photodetector 2a is composed of two split plates A and B which are split in the radial direction of the optical disc, and each of the two split plates A and B independently receives a light beam.

The first and second sub-photodetectors 2b and 2c are composed of two split plates C and D and two split plates E and F, respectively, which are split in the radial direction of the optical disc.

The signal processor includes a plurality of differential amplifiers 3, 4, 5, and 6 for differentially amplifying signals detected by the main photodetector 2a and the first and second sub-photodetectors 2b and 2c. A tracking control unit 7 generates tracking control signals such as a track error signal and a track cross signal from the signals received from the differential amplifiers 3, 4, 5, and 6. An objective lens driver 8 actuates an objective lens based on the tracking control signals received from the tracking control unit 7. Here, a push-pull signal $M_d$ detected by the main photodetector 2a is used as a track error signal (TES).

Since each of the first and second sub-light beams $B_{s1}$ and $B_{s2}$ is displaced from the main light beam $B_m$ by ±½ track pitch, push-pull signals $S_{1d}$ and $S_{2d}$ from the first and second sub-photodetectors 2b and 2c, respectively, output during track cross have phase differences of ±90° from the push-pull signal $M_d$. Accordingly, a track cross signal (TCS) is obtained using the differential signal $S_{1d}-S_{2d}$ of the push-pull signals $S_{1d}$ and $S_{2d}$ and the push-pull signal $M_d$ detected by the main photodetector 2a. A seek direction detection signal is generated from the track cross signal.

The conventional apparatus for generating a seek direction detection signal can simply detect a track cross signal using three beams. However, because the first and second sub-light beams $B_{s1}$ and $B_{s2}$ are arranged to precede or succeed the main light beam $B_m$ while being displaced from the main light beam $B_m$, a problem of cross-erasing of an adjacent track signal occurs on the RAM type optical disc.

SUMMARY OF THE INVENTION

Various objects and advantages of the invention will be set forth in part in the description which follows and, in part, will be obvious from the description, or may be learned by practice of the invention.

The present invention has been made to overcome the abovementioned problems of the related art, and accordingly, it is an object of the present invention to provide an apparatus for use with an optical disc, including: an optical branching unit irradiating a main light beam and a sub-light beam, wherein the sub-light beam includes an optical aberration in a direction on a track of the optical disc; a photodetector including a plurality of portions receiving and processing the main light beam and a plurality of portions receiving and processing the sub-light beam; a track error signal detector detecting a track error signal from the portions receiving the main light beam; a track cross signal detector detecting a track cross signal from the portions receiving the main light beam and from the portions receiving the sub-light beam; and a signal processor comparing the track error signal with the track cross signal to detect a seek direction of a light spot formed on the optical disc.

Furthermore, it is another object of the present invention to provide for an apparatus for use with an optical disc, including an optical disc; a light source; an optical branching unit branching incident light into a main light beam and a sub-light beam, forming a main light spot and a sub-light spot, the sub-light spot including optical aberration in a radial or tangential direction of the optical disc; a main photodetector including a plurality of receiving portions receiving and photoelectrically converting the main light beam reflected from the optical disc; a sub-photodetector including a plurality of receiving portions receiving and photoelectrically converting the sub-light beam reflected from the optical disc; a track error signal detector detecting a track error signal from the receiving portions of the main photodetector; a track cross signal detector processing output signals from the receiving portions of the main photodetector and from the receiving portions of the sub-photodetector to detect a track cross signal; and a signal processor comparing the track error signal with the track cross signal to detect a seek direction.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE PRESENT INVENTION

Hereinafter, the preferred embodiment of the present invention will be described in greater detail with reference to the accompanying drawings.

Figure 1:
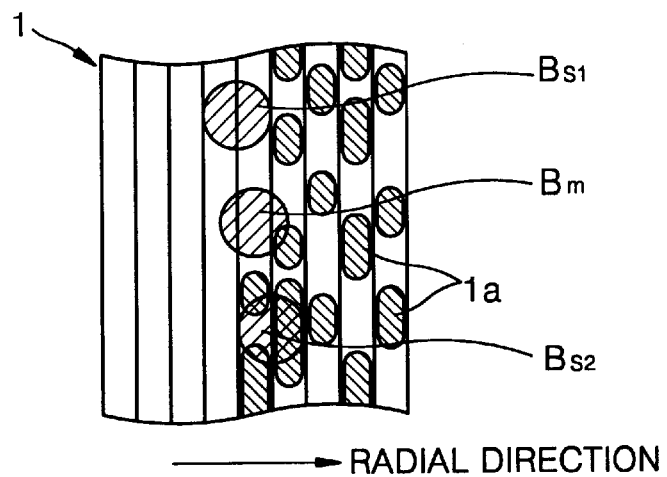
FIG. 1 is a schematic diagram illustrating the shapes of optical spots formed on an optical disc having a land and groove structure in a conventional optical pickup.
Figure 2:
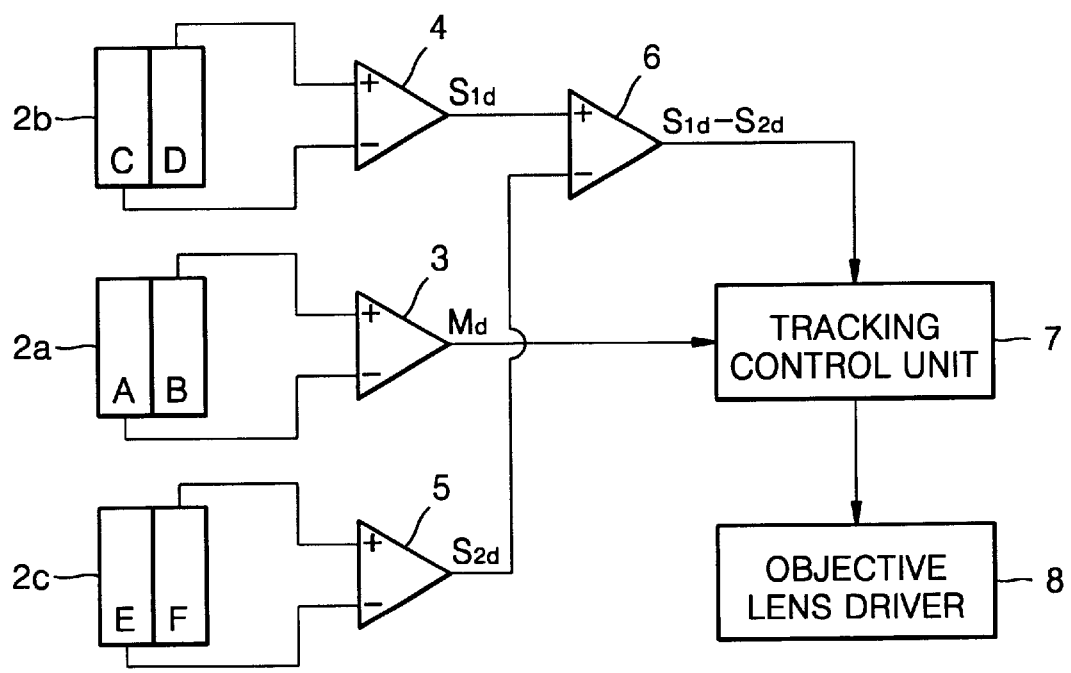
FIG. 2 is a schematic diagram illustrating a conventional apparatus generating a seek direction detection signal.
Figure 3:
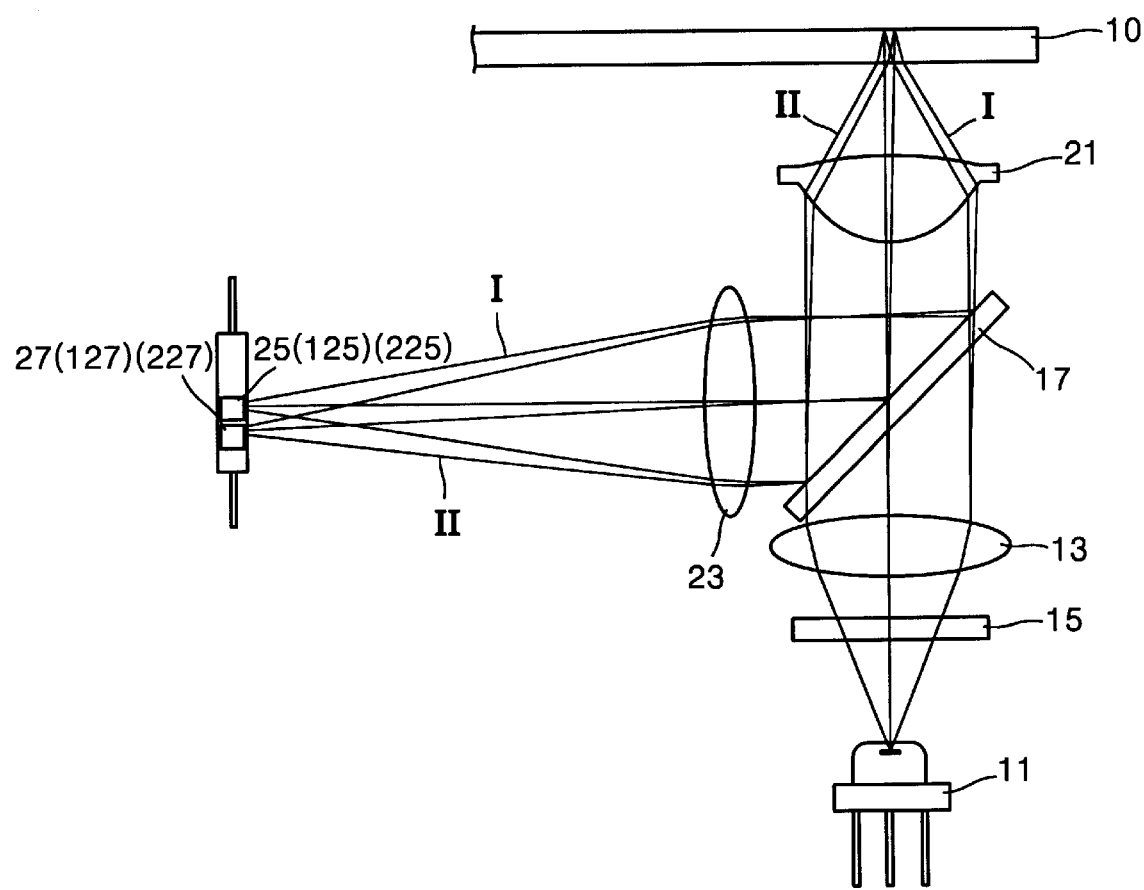
FIG. 3 is a schematic diagram illustrating the optical arrangement of an optical pickup employing an apparatus generating a seek direction detection signal, in accordance with an exemplary embodiment of the present invention.

Referring to FIG. 3, an optical pickup employing an apparatus generating a seek direction detection signal according to an embodiment of the present invention includes a light source 11, a light path changing unit, an objective lens 21 focusing incident light, and an apparatus generating a seek direction detection signal. The apparatus generating a seek direction detection signal further includes an optical branching unit or means disposed between the light source 11 and an optical disc 10, a photodetector or photodetecting means for receiving light reflected from the optical disc 10, and a signal processor or processing means (not shown) for processing the received light.

To obtain a recording density of the optical disc 10 of about 15 GB or greater, the light source 11 irradiates light having a blue wavelength, for example, a wavelength of about 400 nm, and the objective lens 21 has a numerical aperture of 0.6 or greater. Divergent light emitted from the light source 11 passes through a collimating lens 13 so as to become parallel light. The light path changing unit is provided between the light source 11 and the objective lens 21 and changes the path of the light. In other words, the light path changing unit directs incident light from the light source 11 toward the objective lens 21, and directs incident light from the objective lens 21 toward the photodetector.

The light path changing unit may include a beam splitter 17 to change the path of light by splitting the incident light at a predetermined quantity of light ratio and passing and reflecting the split light.

Figure 4:
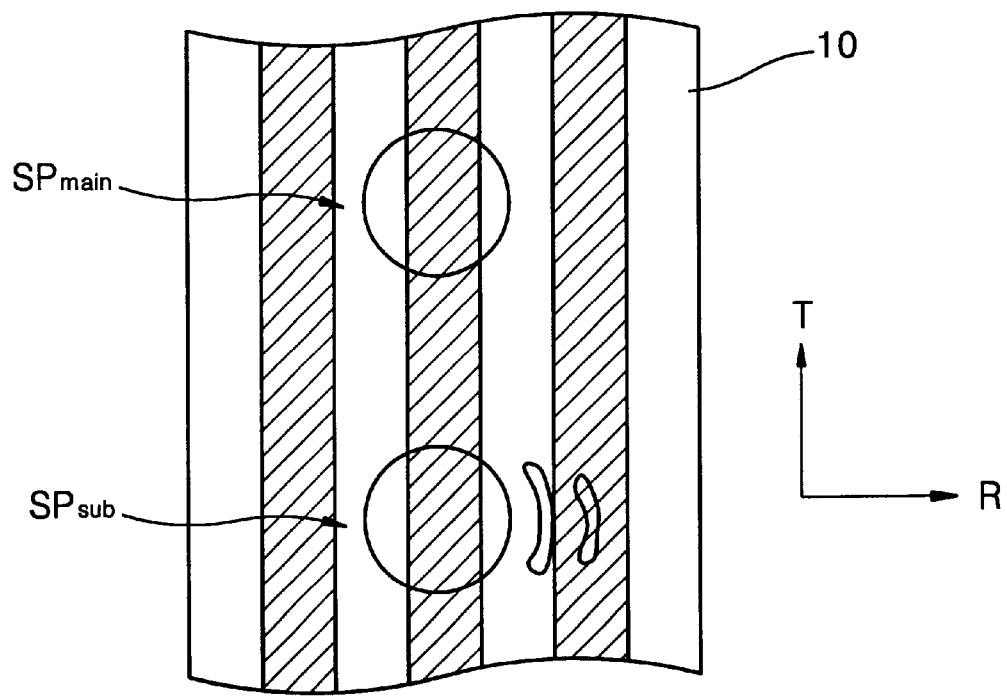
FIG. 4 is a schematic diagram illustrating a main light spot and a sub-light spot having optical aberration in a radial direction, which are formed on the optical disc having a land and groove structure as shown in FIG. 3.
Figure 19:
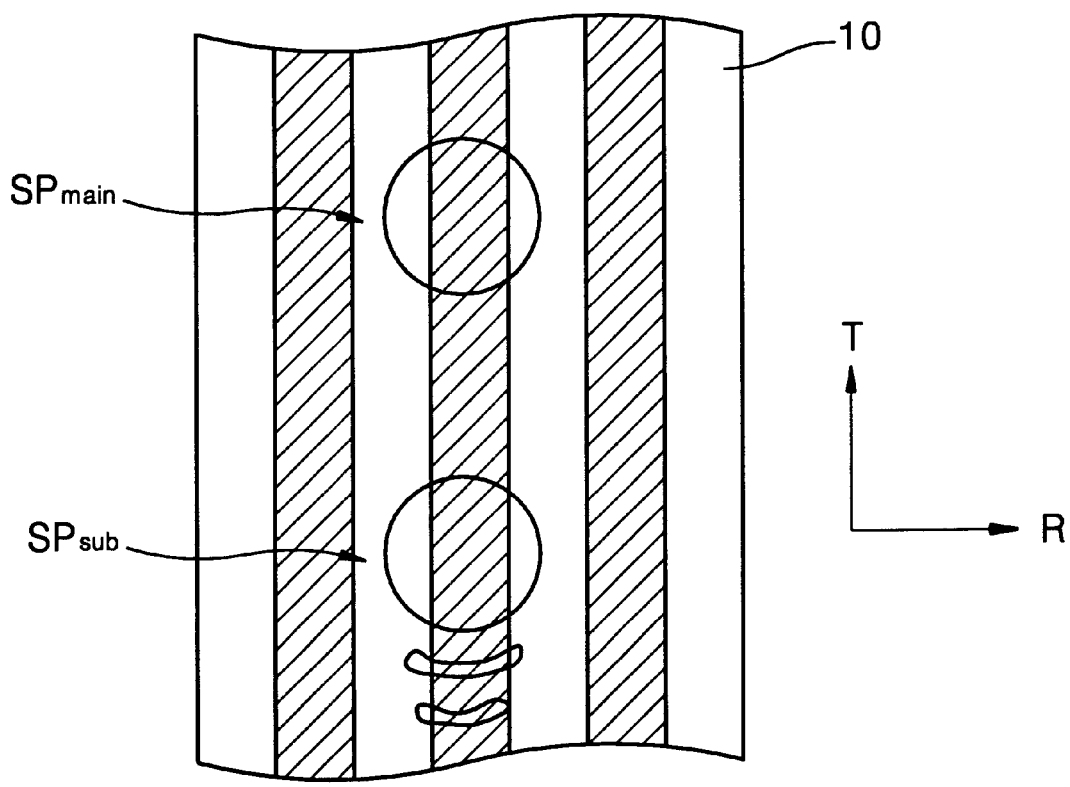
FIG. 19 is a schematic diagram illustrating the main light spot and the sub-light spot having optical aberration in the tangential direction, which are formed on the optical disc having the land and the groove structure shown in FIG. 3 by the optical pickup, in accordance with an exemplary embodiment of the present invention.

The light emitted from the light source 11 is branched into at least two light beams including a main light beam I and a sub-light beam II by the optical branching unit, thereby forming a main light spot $SP_{main}$ and a sub-light spot $SP_{sub}$, as shown in FIGS. 4 and 19. As shown in FIGS. 4 and 19, the main light beam I forms a main light spot $SP_{main}$ without having aberration, and the sub-light beam II forms a sub-light spot $SP_{sub}$ having a predetermined optical aberration such as a coma. More particularly, when the optical disc 10 is disposed without tilt, the main light spot $SP_{main}$ does not have aberration, and the sub-light spot $SP_{sub}$ has aberration.

To provide for the main light spot $SP_{main}$ without aberration and the sub-light spot $SP_{sub}$, the optical branching unit includes a hologram device 15 that branches incident light into a main light beam I, which is a zero-order diffracted beam, and a sub-light beam II, which is a first order diffracted beam. The hologram device 15 simultaneously provides the predetermined optical aberration to the sub-light beam II such that the main light beam I is a no optical aberration light beam, and the sub-light beam II has a predetermined amount of optical aberration.

The optical axis of the sub-light beam II slants with respect to the optical axis of the main light beam I due to the optical aberration, and the sub-light spot $SP_{sub}$ is obliquely formed on the optical disc 10 in a radial direction R, as shown in FIG. 4, or a tangential direction T, as shown in FIG. 19, at a predetermined slope. Therefore, the sub-light spot $SP_{sub}$ has the predetermined optical aberration corresponding to the predetermined amount of radial tilt or tangential tilt between the sub-light beam II and the optical disc 10. To form such predetermined optical aberration, the hologram device 15 has a predetermined hologram pattern. Hologram devices are widely known, and thus a detailed description thereof will be omitted.

FIG. 4 is a schematic diagram illustrating the optical branching unit designed to form a single sub-light spot $SP_{sub}$ following a main light beam $SP_{main}$. Alternatively, the optical branching unit may be designed to form a sub-light spot (not shown) leading the main light spot $SP_{main}$. In another aspect, the optical branching unit may be designed to form a pair of sub-light spots $SP_{sub}$, respectively, leading and following the main light spot $SP_{main}$.

Referring to FIG. 3, the objective lens 21 focuses the main light beam I and the sub-light beam II branched by the hologram device 15 on a certain track on the optical disc 10 such that the sub-light beam II is focused on the same track on which the main light beam I is focused, with optical aberration in the radial direction R or the tangential direction T through the hologram 15 as described above.

The main light beam I and the sub-light beam II, which are reflected from the optical disc 10 and pass through the objective lens 21 and the beam splitter 17, are separately collected by a collecting lens 23, and are received by the photodetector. The photodetector includes a main photodetector or main photodetecting means 25 (FIG. 5), 125 (FIG. 18) or 225 (FIG. 19), having a plurality of receiving portions receiving and photoelectrically converting the main light beams I, and a sub-photodetector or sub-photodetecting means 27 (FIG. 5), 127 (FIG. 18) or 227 (FIG. 19), having a plurality of receiving portions receiving and photoelectrically converting the sub-light beam II.

The main photodetector 25 or 125 and the sub-photodetector 27 or 127 are employed when the sub-light spot $SP_{sub}$ is formed to have optical aberration in the radial direction R by the hologram device 15, as shown in FIG. 4. The main photodetector 225 and the sub-photodetector 227 are employed when the sub-light spot $SP_{sub}$ is formed to have optical aberration in the tangential direction T by the hologram device 15, as shown in FIG. 19.

Figure 5:
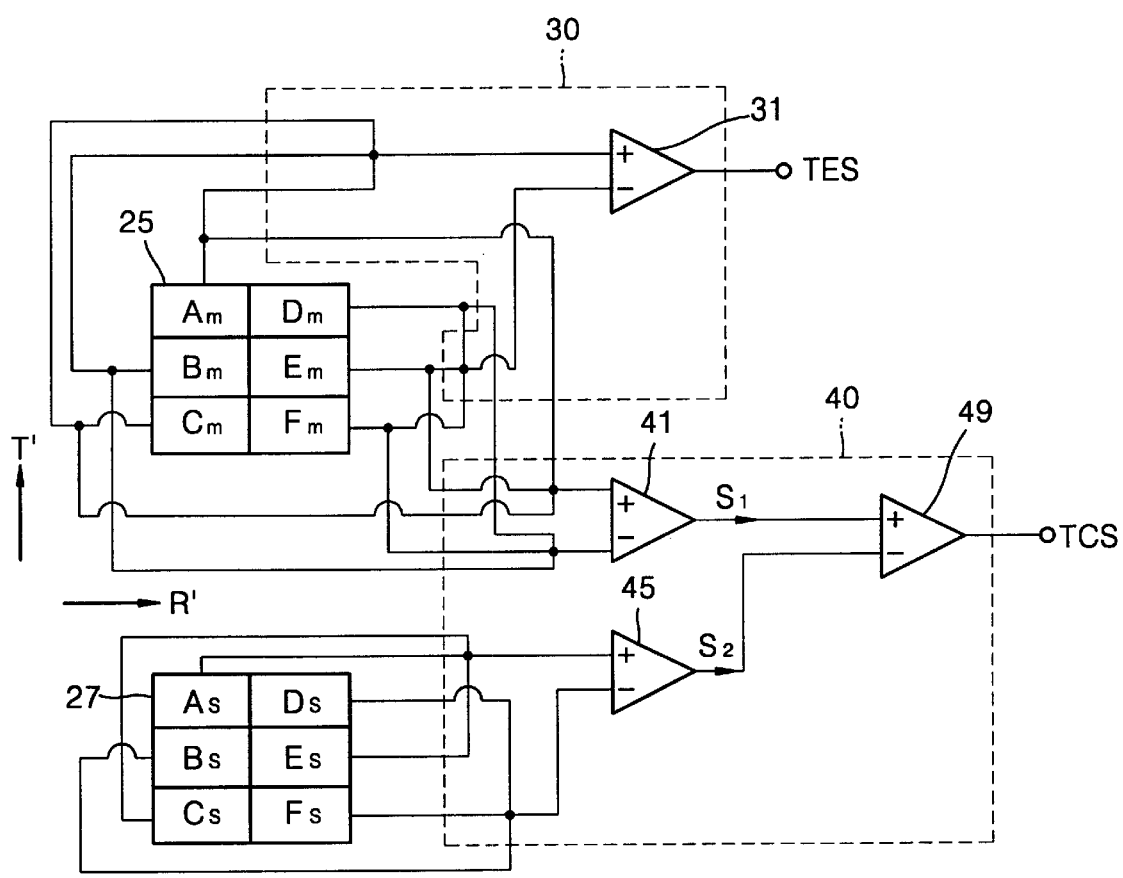
FIG. 5 is a schematic diagram illustrating the structure of a photodetector and signal processors processing signals from the photodetector, in accordance with an exemplary embodiment of the present invention.

Referring to FIG. 5, a main photodetector 25 according to a first embodiment of the present invention includes first through third receiving portions $A_m$, $B_m$ and $C_m$ disposed in a direction T' corresponding to the tangential direction T' of the optical disc 10, and fourth through sixth receiving portions $D_m$, $E_m$ and $F_m$ disposed in a direction T' corresponding to the tangential direction T' of the optical disc 10. The fourth through sixth receiving portions $D_m$, $E_m$ and $F_m$ are adjacent to the first through third receiving portions $A_m$, $B_m$ and $C_m$, respectively, in a direction R' corresponding to the radial direction R of the optical disc 10; thus, dividing the received main light beam I into six portions and then photoelectrically converting the individual six portions.

Similarly, a sub-photodetector 27 includes first through third receiving portions $A_s$, $B_s$ and $C_s$ disposed in a direction T' corresponding to the tangential direction T' and fourth through sixth receiving portions $D_s$, $E_s$ and $F_s$ disposed in a direction T' corresponding to the tangential direction T'. The fourth through sixth receiving portions $D_s$, $E_s$ and $F_s$ are adjacent to the first through third receiving portions $A_s$, $B_s$ and $C_s$, respectively, in a direction R' corresponding to the radial direction R; thus, dividing the received sub-light beam II into six portions and then photoelectrically converting the individual six portions.

As shown in FIG. 5, a signal processor includes a track error signal detector or means 30 to detect a track error signal TES from signals output from the receiving portions of the main photodetector 25, and a track cross signal detector or means 40 to detect a track cross signal TCS from signals output from the receiving portions of the main photodetector 25 and signals output from the receiving portion of the sub-photodetector 27. The signal processor compares the track error signal TES with the track cross signal TCS to detect a seek direction.

The track error signal detector 30 performs a differential operation using a differential device 30 to generate the track error signal TES. Specifically, the differential device 30 determines the difference between the sum of the signals from the first through third receiving portions $A_m$, $B_m$, and $C_m$ of the main photodetector 25 and the sum of the signals from the fourth through sixth receiving portions $D_m$, $E_m$ and $F_m$ of the main photodetector 25. More particularly, the track error signal detector 30 detects a push-pull signal from the main light beam I and outputs the push-pull signal as the track error signal TES.

In the first embodiment, the track cross signal detector 40 includes first through third differential devices 41, 45, and 49. The first differential device 41 performs a differential operation between the sum of the signals from the first, third, and fifth receiving portions $A_m$, $C_m$, and $E_m$, which are not adjacent to one another, in the direction T' and in the direction R' in the main photodetector 25, and the sum of the signals from the second, fourth, and sixth receiving portions $B_m$, $D_m$ and $F_m$, which are not adjacent to one another, in the direction T' and in the direction R' in the main photodetector 25, thereby outputting a first differential signal $S_1$. The second differential device 45 performs a differential operation between the sum of the signals from the first, third, and fifth receiving portions $A_s$, $C_s$ and $E_s$, which are not adjacent to one another, in the direction T' and in the direction R' in the sub-photodetector 27, and the sum of the signals from the second, fourth, and sixth receiving portions $B_s$, $D_s$ and $F_s$, which are not adjacent to one another, in the direction T' and in the direction R' in the sub-photodetector 27, thereby outputting a second differential signal $S_2$. The third differential device 49 performs a differential operation between the first differential signal $S_1$ from the first differential device 41 and the second differential signal $S_2$ from the second differential device 45, thereby outputting the track cross signal TCS.

A phase difference exists between the track error signal TES from the track error signal detector 30 and the track cross signal TCS from the track cross signal detector 40, which will be later described. Therefore, the seek direction of a light spot, that is, the main light spot $SP_{main}$, can be obtained from the phase difference between track error signal TES and the track cross signal TCS. In addition, the relative positions of the main light spot $SP_{main}$ and the center of a certain track on the optical disc 10, with respect to each other can be obtained from the phase difference. Moreover, the land and the groove on the optical disc can be discriminated from each other using the track cross signal TCS.

Figure 6:
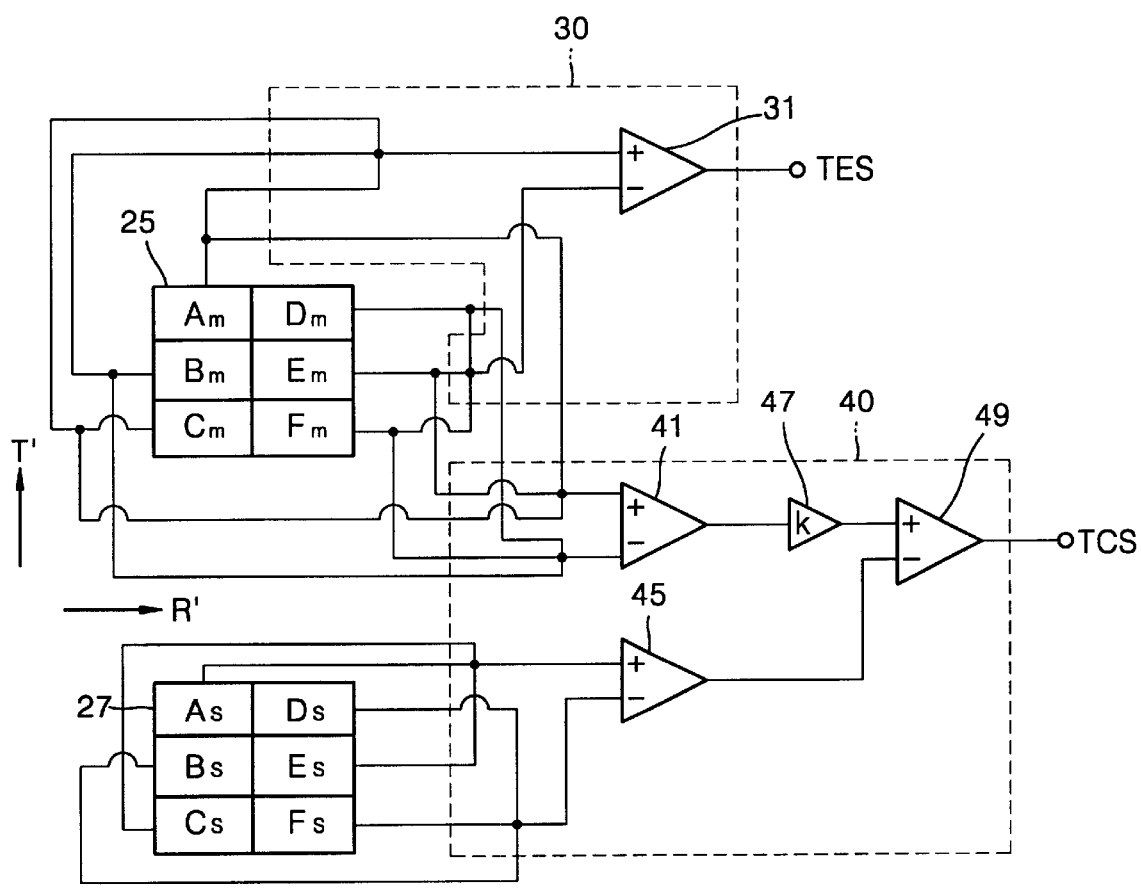
FIG. 6 is a schematic diagram illustrating the structure of a photodetector and signal processors processing signals output from the photodetector including a gain controller, in accordance with an alternative exemplary embodiment of the present invention.

Referring to FIG. 6, in order to generate an optimal track cross signal TCS, taking into account the difference between the intensities of the main light beam I and the sub-light beam II, and to generate an optimal seek direction detection signal from the track cross signal TCS, the track cross signal detector 40 may further include a gain controller 47. The gain controller 47 applies a predetermined gain "k" to the first differential signal $S_1$ from the first differential device 41 for the main light beam I. The output from the gain controller 47 is provided to the third differential device 49. The gain controller 47 may be disposed between the second differential device 45 for the sub-light beam II and the third differential device 49.

Figure 7:
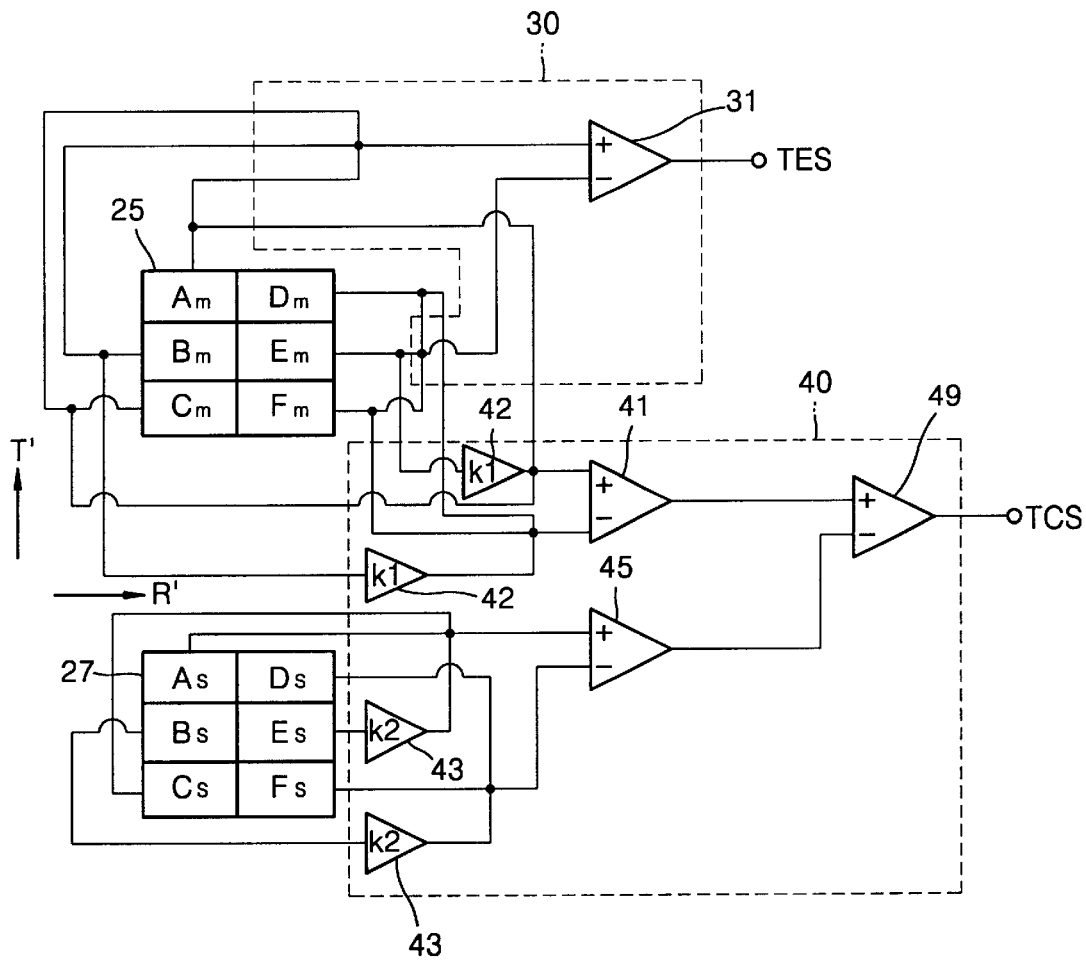
FIG. 7 is a schematic diagram illustrating the structure of a photodetector and signal processors processing signals output from the photodetector including multiple gain controllers, in accordance with an alternative exemplary embodiment of the present invention.

As shown in FIG. 7, the track cross signal detector 40 may further include a pair of gain controllers 42 for applying a predetermined gain "k1" to the signals from the second and fifth receiving portions $B_m$ and $E_m$ of the main photodetector 25 and inputting the results to the first differential device 41. The track cross signal detector 40 may further include a pair of gain controllers 43 applying a predetermined gain "k2" to the signals from the second and fifth receiving portions $B_s$ and $E_s$ of the sub-photodetector 27 and inputting the results to the second differential device 45. Here, the track cross signal detector 40 can detect a track cross signal TCS optimized with respect to the widths of the receiving portions $B_m$ and $B_s$ and the fifth receiving portions $E_m$ and $E_s$ in the main and sub-photodetectors 25 and 27, respectively, in the direction T' corresponding to the tangential direction and the sizes of light spots. Alternatively, the track cross signal detector 40 may include all the gain controllers 42, 43, and 47 as described in FIGS. 6 and 7.

Figure 8:
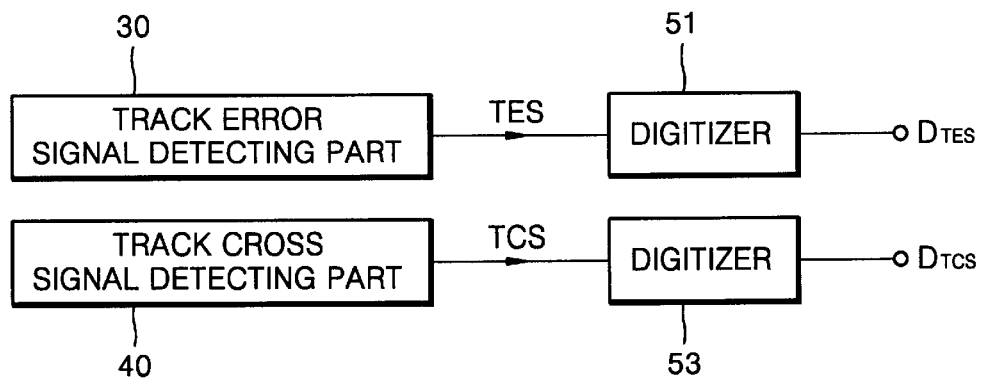
FIG. 8 is a schematic diagram illustrating another embodiment of signal processors.

The signal processor of FIG. 5, 6, or 7 may further include a first digitizer 51 for digitizing the track error signal TES output from the track error signal detector 30 to generate a digitized track error signal $D_{TES}$. As shown in FIG. 8, the signal processor may also include a second digitizer 53 digitizes the track cross signal TCS output from the track cross signal detector 40 to generate a digitized track cross signal $D_{TCS}$. Since there is a phase difference of 90° between the digitized track error signal $D_{TES}$ and the digitized track cross signal $D_{TCS}$ in the land and groove, the digitized track error signal $D_{TES}$ and the digitized track cross signal DTcS can be easily compared, thereby detecting a seek direction and the relative positions of the center of the main light spot $SP_{main}$ and the center of a certain track on the optical disc 10 with respect to each other. In addition, the digitized track cross signal $D_{TCS}$, as will later be described, may include a "high" level in the land and a "low" level in the groove, so that the land and the groove can be easily discriminated from each other.

Each of the first and the second digitizers 51 and 53 may include a comparator which outputs, for example, a "high" signal when an input signal is larger than a reference value and a "low" signal when the input signal is smaller than the reference value. The signal processor may include only one digitizer (not shown) for digitizing the track cross signal TCS output from the track cross signal detector 40 so that the land and groove can be discriminated from each other using the digitized track cross signal DTCS.

The apparatus for generating a seek direction detection signal in accordance with an exemplary embodiment of the present invention, employs the main and sub-photodetectors 25 and 27 and one of the signal processors illustrated in FIGS. 5 through 8, to generate a seek direction detection signal using the phase difference between the track error signal TES from the track error signal detector 30 and the track cross signal TCS from the track cross signal detector 40 (or between the digitized track error signal and the digitized track cross signal), and to generate a land/groove discrimination signal. The seek direction of the main light spot $SP_{main}$ formed on the optical disc 10 and the relative position between the center of the main light spot $SP_{main}$ and a track center on the optical disc 10 can be obtained using the seek direction detection signal. Moreover, the land/groove discrimination signal may be used to determine whether a track on which the main light spot $SP_{main}$ is formed is land or a groove.

The operation of the apparatus for generating a seek direction detection signal in the optical pickup where a sub-light spot has optical aberration in the radial direction R of the optical disc 10, will be described. The apparatus employs the photodetector and the signal processor of FIG. 5. The graphs of FIGS. 9 through 17 illustrate signals detected by the signal processor of FIG. 5 in the case where a sub-light spot has optical aberration corresponding to a radial tilt of 0.25° in the radial direction of the optical disc 10. Further, for illustrative purposes, a numerical aperture of the objective lens in the optical pickup is 0.65, the wavelength of the light source is 400 nm, the width of each of the land and the groove tracks of the optical disc 10 is 0.37 μm, and the optical disc 10 is disposed without tilt.

Accordingly, FIGS. 9, 10, 12, and 14 through 17 illustrate signals detected by the signal processor of FIG. 5. FIGS. 11 and 13 illustrate the signals $D_{TES}$ and $D_{TCS}$ resulting from digitizing the track error signals TES and the track cross signals TCS of FIGS. 10 and 12, respectively.

In FIGS. 9 through 17, the horizontal axis denotes track positions normalized using a track pitch tp of the optical disc 10, and the vertical axis denotes output signals with respect to individual normalized track positions. The track pitch tp indicates the distance from the center of land to the center of an adjacent groove or the distance from the center of a groove to the center of adjacent land in the optical disc. Points on the horizontal axis indicate distances corresponding to one through seven times the track pitch tp. For instance, if assumed that the point indicated by 0 on the horizontal axis is the center of a groove, the point indicated by 1 is the center of the next land.

Figure 9:
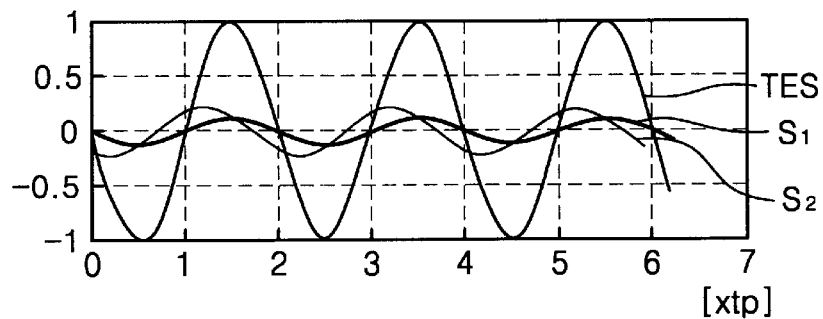
FIG. 9 is a graph illustrating first and second differential signals from the first and second differential devices of FIG. 5 and a track error signal from a track error signal detector of FIG. 5 when a radial tilt does not exist between the optical disc and a sub-light spot, and when a main light spot moves to the outer side of the optical disc.
Figure 10:
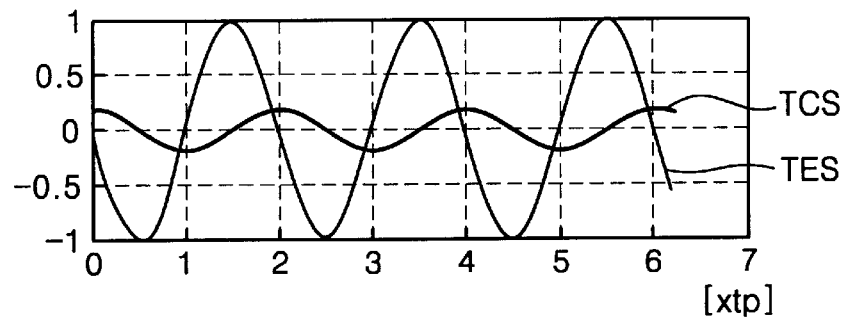
FIG. 10 is a graph illustrating a track cross signal from a track cross signal detector of FIG. 5 and the track error signal from the track error signal detector of FIG. 5 when the radial tilt does not exist between the optical disc and the sub-light spot, and when a light spot moves to the outer side of the optical disc.
Figure 11:
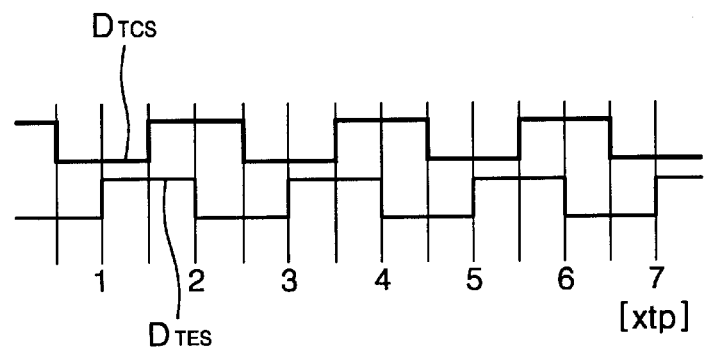
FIG. 11 is a graph illustrating signals resulting from digitizing the track cross signal and the track error signal of FIG. 10.

FIGS. 9 and 10 illustrate the track error signal TES, the first and second differential signals $S_1$ and $S_2$, and the track cross signal TCS when a light spot moves from the center toward the outer side of the optical disc 10 in the radial direction, in the event that there is no radial tilt between the optical disc 10 and a main light beam 1. FIG. 11 illustrates the signals $D_{TES}$ and $D_{TCS}$ resulting from digitizing the signals TES and TCS of FIG. 10 using the digitizers 51 and 53 of FIG. 8.

Figure 12:
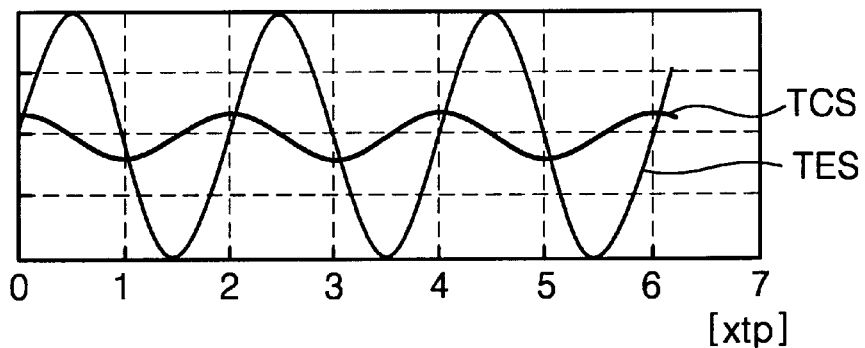
FIG. 12 is a graph illustrating the track cross signal from the track cross signal detector of FIG. 5 and the track error signal from the track error signal detector of FIG. 5 when the radial tilt does not exist between the optical disc and the sub-light spot, and when a light spot moves to the inner side of the optical disc.
Figure 13:
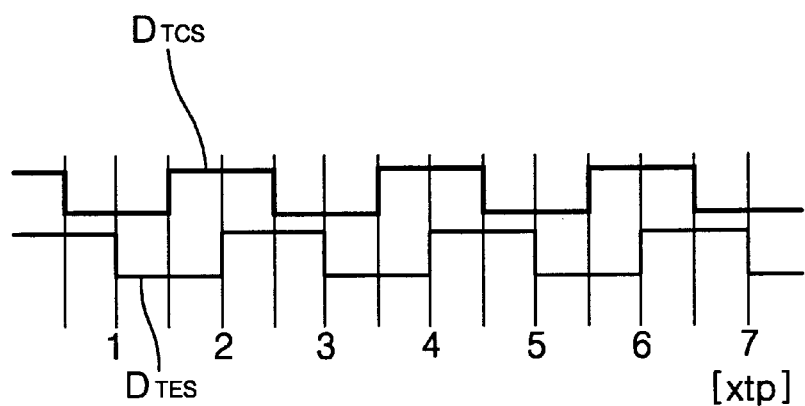
FIG. 13 is a graph illustrating signals resulting from digitizing the track cross signal and the track error signal of FIG. 12.

FIG. 12 illustrates a track error signal TES and a track cross signal TCS when a light spot moves from the outer circumference toward the inner side of the optical disc 10 in the radial direction, and when there is no radial tilt between the optical disc 10 and an main light beam 1. FIG. 13 illustrates the signals $D_{TES}$ and $D_{TCS}$ resulting from digitizing the signals TES and TCS of FIG. 12 using the digitizers 51 and 53 of FIG. 8.

Referring to FIG. 9, for illustrative purposes, points 1, 3, 5, and 7 on the horizontal axis are the centers of land tracks, and the points 2, 4, and 6 are the centers of groove tracks. Because a sub-light beam II has a predetermined amount of optical aberration in the radial direction, the difference between the first differential signal $S_1$ and the second differential signal $S_2$ is largest at the center of each track. When a differential operation is performed on the signals $S_1$ and $S_2$, the track cross signal TCS of FIG. 10 is obtained. The track cross signal TCS has a phase difference of 90° with respect to the track error signal TES. Similarly, as shown in FIG. 11, the signals $D_{TES}$ and $D_{TCS}$ resulting from digitizing the track error signal TES and the track cross signal TCS have a phase difference of 90° therebetween.

Accordingly, as shown in FIG. 10, when the light spot moves outward on the optical disc 10, at the land track centers 1, 3, 5, and 7, the track cross signal TCS has a minimum peak value and the track error signal TES is rising. In contrast, as shown in FIG. 12, when the light spot moves inward on the optical disc 10, at the land track centers 1, 3, 5, and 7, the track cross signal TCS has a minimum peak value and the track error signal TES is falling.

Similarly, as shown in FIG. 11, when the light spot moves outward on the optical disc 10, at the land track centers 1, 3, 5, and 7, the signal $D_{TCS}$ is in a "low" state, and the signal $D_{TES}$ is rising. As shown in FIG. 13, when the light spot moves inward on the optical disc 10, at the land track centers 1, 3, 5, and 7, the signal $D_{TCS}$ is in a "low" state, and the signal $D_{TES}$ is falling.

As described above, because there is a phase difference of 90° between the track error signal TES and the track cross signal TCS (or the signals $D_{TES}$ and $D_{TCS}$), a seek direction in which the light spot is moved to a target track can be detected from these signals. In addition, the relative position between the center of the light spot and the center of a track can be obtained.

Referring to FIGS. 9 and 10, at the land track centers 1, 3, 5, and 7, the first differential signal $S_1$ is smaller than the second differential signal $S_2$, and the track cross signal TCS has a minimum peak value. On the other hand at the groove track centers 2, 4, and 6, the first differential signal $S_1$ is larger than the second differential signal $S_2$, and the track cross signal TCS has a maximum peak value. Referring to FIGS. 10 and 12, the track cross signal TCS has a minimum peak value at the land track centers 1, 3, 5, and 7, and has a maximum peak value at the groove track centers 2, 4, and 6 regardless of the direction in which the light spot moves. Similarly, referring to FIGS. 11 and 13, the signal $D_{TCS}$ is "low" at the land track centers 1, 3, 5, and 7 and is "high" at the groove track centers 2, 4, and 6 regardless of the direction in which the light spot moves. Accordingly, because the signal $D_{TCS}$ (the signal TCS) is "low" (lower than a reference signal) at the land track centers and is "high" (higher than the reference signal) at the groove track centers, the land and the groove can be discriminated from each other. In other words, the land/groove discrimination signal can be generated using the track cross signal TCS.

The polarities of the waveforms illustrated in FIGS. 10 through 13 may be reversed depending on the direction of the optical aberration applied to the sub-light beam II in the radial direction, and the magnitude of a signal varies with the value of optical aberration corresponding to the radial tilt of the sub-light beam II. Furthermore, as illustrated on FIGS. 9 through 13, when using the apparatus of the present invention for generating the seek direction detection signal designed in an exemplary embodiment, such that a sub-light spot $SP_{sub}$ has a predetermined amount of optical aberration in the radial direction of the optical disc 10, the direction in which the light-spot moves, that is, the seek direction, and the relative positions of the light spot and the center of a track on the optical disc 10 with respect to each other can be detected. Additionally, the land and the groove can be discriminated from each other.

Moreover, as illustrated in FIGS. 9 through 13, the apparatus for generating a seek direction detection signal in an exemplary embodiment, is designed such that the sub-light spot $SP_{sub}$ has a predetermined amount of optical aberration in the radial direction of the optical disc 10 and the seek direction and the relative position can be detected. Further, the land and the groove can be discriminated from each other, even when the sub-light spot $SP_{sub}$ has optical aberration corresponding to a radial tilt of 0.25° smaller than the radial tilt (for example, ±0.35°) of the optical disc 10 which is a basic tilt in a conventional system. Since the sub-light spot $SP_{sub}$ has a small optical aberration, a signal having a large signal-to-noise (S/N) ratio can be detected.

As illustrated in FIGS. 14 through 17, the apparatus for generating a seek direction detection signal is designed such that the sub-light spot $SP_{sub}$ has a predetermined amount of optical aberration in the radial direction of the optical disc 10 and the seek direction and the relative position can be detected. Further, the land and the groove can be discriminated from each other, even when there is a radial tilt between a main light beam I and the optical disc 10.

Figure 14:
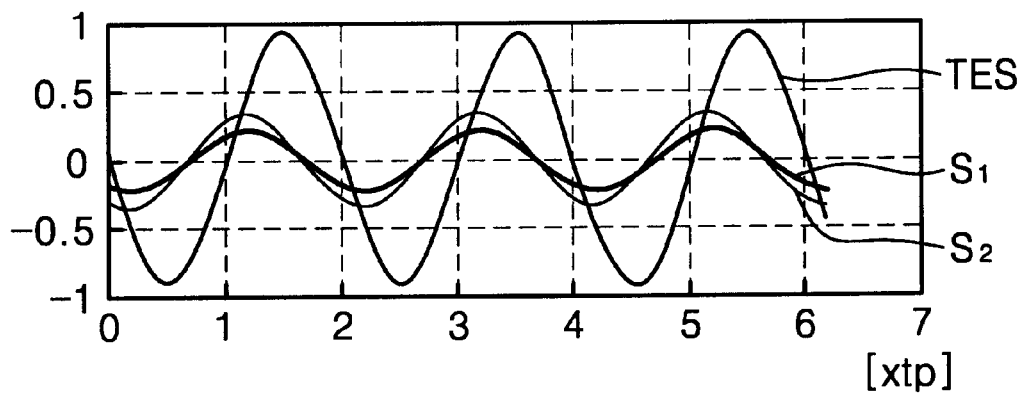
FIG. 14 is a graph illustrating signals corresponding to FIG. 9 when the radial tilt between the optical disc and the sub-light spot is 0.25°.
Figure 15:
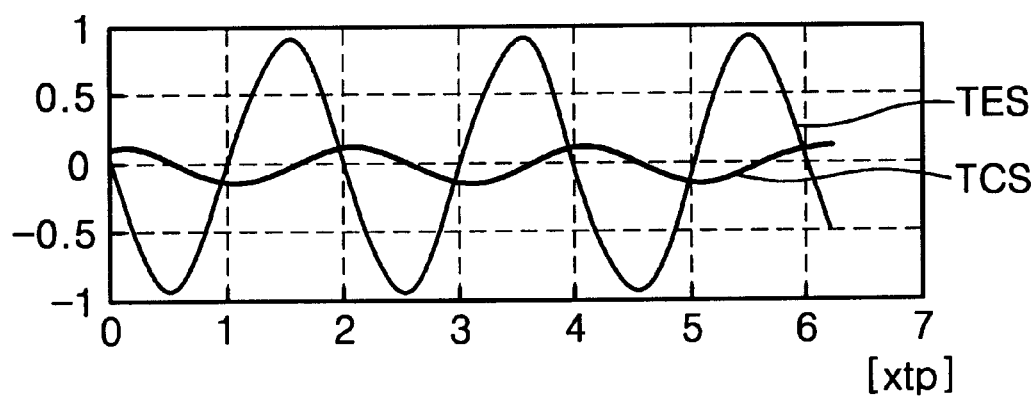
FIG. 15 is a graph illustrating signals corresponding to FIG. 10 when the radial tilt between the optical disc and the sub-light spot is 0.25°.
Figure 16:
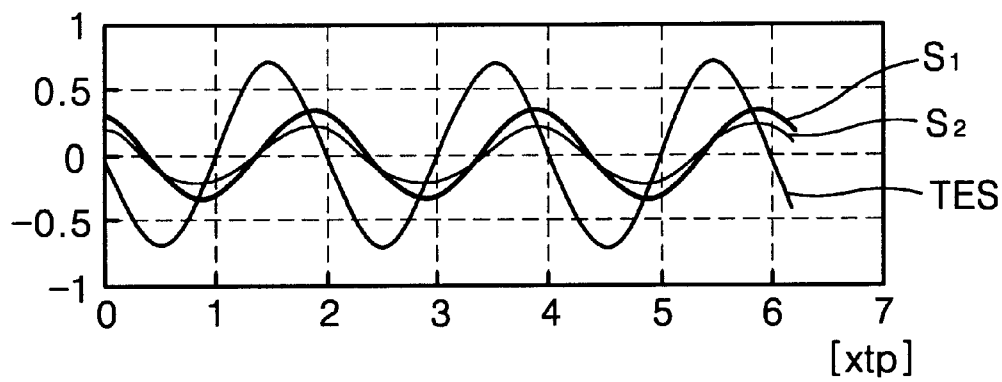
FIG. 16 is a graph illustrating signals corresponding to FIG. 9 when the radial tilt between the optical disc and the sub-light spot is −0.5°.
Figure 17:
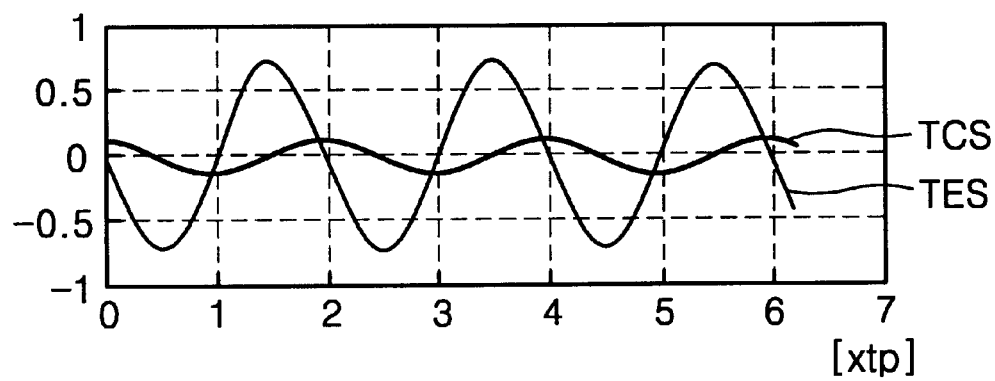
FIG. 17 is a graph illustrating signals corresponding to FIG. 10 when the radial tilt between the optical disc and the sub-light spot is −0.5°.

FIGS. 14 and 15 illustrate the first and the second differential signals $S_1$ and $S_2$, the track error signal TES, and a comparison between the track error signal TES and the track cross signal TCS obtained by performing a differential operation on the first and second differential signals $S_1$ and $S_2$ respectively, when a radial tilt between the optical disc 10 and a main light beam I is 0.25°. FIGS. 16 and 17 illustrate the first and second differential signals $S_1$ and $S_2$, a track error signal TES, and a comparison between the track error signal TES and the track cross signal TCS obtained by performing a differential operation on the first and second differential signals $S_1$ and $S_2$, respectively, when a radial tilt between the optical disc 10 and a main light beam I is -0.5°.

Referring to FIGS. 14 through 17, similarly to the above description, the track cross signal TCS has peaks at the land and the groove track centers, and the track error signal TES is rising or falling at either of the land and groove tracks. Accordingly, the apparatus of the present invention can generate a seek direction detection signal, a relative position detection signal, and a land/groove discrimination signal even when a radial tilt occurs between the main light beam I and the optical disc 10, that is, a relative radial tilt occurring between the objective lens and the optical disc 10.

In FIGS. 14 through 17, a sub-light beam II fundamentally has an optical aberration of 0.25° in the radial direction regardless of the radial tilt between the main light beam I and the optical disc 10. Accordingly, when the radial tilt between the main light beam I and the optical disc 10 is 0.25°, as shown in FIGS. 14 and 15, the main light spot $SP_{main}$ formed on the optical disc 10 has an optical aberration corresponding to the radial tilt of 0.25°, and the sub-light Spot $SP_{sub}$ formed on the optical disc 10 has an optical aberration corresponding to a radial tilt of 0.5°. As shown in FIGS. 16 and 17, when the radial tilt between the main light beam I and the optical disc 10 is −0.5°, the main light Spot $SP_{main}$ formed on the optical disc 10 has an optical aberration corresponding to a radial tilt of −0.5°, and the sub-light Spot $SP_{sub}$ formed on the optical disc 10 has an optical aberration corresponding to a radial tilt of −0.25°.

Figure 18:
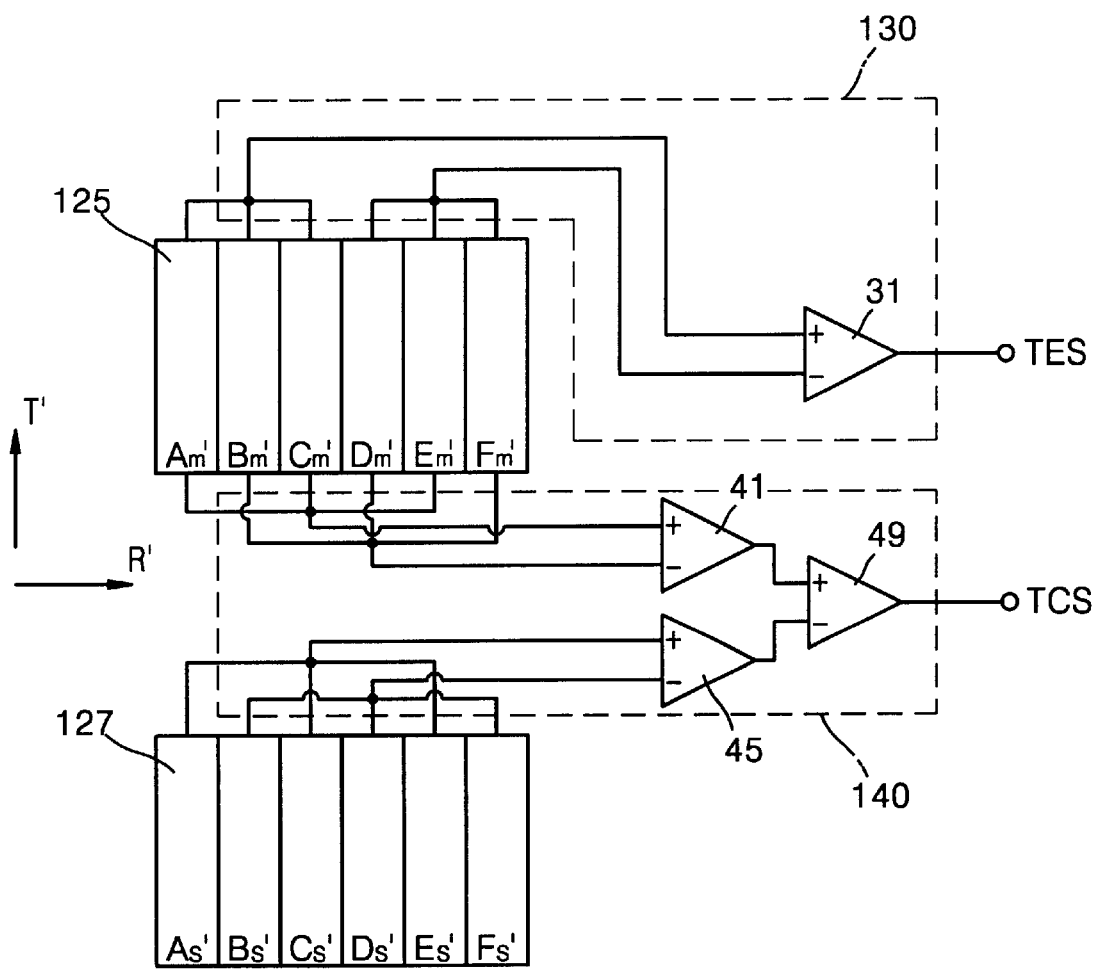
FIG. 18 is a schematic diagram illustrating the structure of a photodetector and a signal processor processing signals output from the photodetector, in accordance with an exemplary embodiment of the present invention.

FIG. 18 illustrates a second embodiment of a photodetector where the optical aberration of the sub-light spot $SP_{sub}$ occurs in the radial direction of the optical disc 10, as shown in FIG. 4. The photodetector includes a main photodetector 125 receiving main light beams I and a sub-photodetector 127 for receiving sub-light beams II. Each of the main photodetector 125 and the sub-photodetector 127 includes first through sixth receiving portions disposed in a direction R' corresponding to the radial direction of the optical disc 10.

A track error signal detector 130 in a signal processor detects a track error signal TES from signals output from the main photodetector 125. Specifically, the track error signal detector 130 performs a differential operation between the sum of the signals output from the first through third receiving portions $A_m'$, $B_m'$, and $C_m'$ of the main photodetector 125 and the sum of the signals output from the fourth through sixth receiving portions $D_m'$, $E_m'$, and $F_m'$ of the main photodetector 125 in a differential device 31 to detect the track error signal TES.

A track cross signal detector 140 in the signal processor detects a track cross signal TCS from signals output from the main photodetector 125 and the sub-photodetector 127. Specifically, the first differential device 41 performs a differential operation on a signal obtained by performing a differential operation between the sum of the signals from the first, third, and fifth receiving portions $A_m'$, $C_m'$, and $E_m'$, which are not adjacent to one another in a direction R' and corresponding to the radial direction of the optical disc 10 in the main photodetector 125, and the sum of the signals from the second, fourth, and sixth receiving portions $B_m'$, $D_m'$, and $F_m'$, which are not adjacent to one another in the direction R' in the main photodetector 125. The second differential device 45 performs a differential operation between the sum of the signals from the first, third, and fifth receiving portions $A_s'$, $C_s'$, and $E_s'$, which are not adjacent to one another in the direction R' and corresponding to the radial direction of the optical disc 10 in the sub-photodetector 127, and the sum of the signals from the second, fourth, and sixth receiving portions $B_s'$, $D_s'$, and $F_s'$, which are not adjacent to one another in the direction R' in the sub-photodetector 127. The differential device 49 in the track cross signal detector 140 then performs a differential operation between the output signals from the first differential device 41 and the second differential device 45, thereby detecting the track cross signal TCS. For the track cross signal detector 140, one of the structures of the track cross signal detector 40 shown in FIGS. 5 through 7 can be employed. FIG. 18 illustrates an example employing the structure of FIG. 5 for the track cross signal detector 140. In FIG. 18, the signals from the track error signal detector 130 and the track cross signal detector 140 can be digitized, as shown in FIG. 8, to detect a seek direction and discriminate the land from the groove.

In the case where the photodetector according to the second embodiment is used as described above, the characteristics of the track error signal TES the track cross signal TCS from the track error signal detector 130, and the track cross signal detector 140 are substantially similar to the characteristics of the signals detected in the structure of the photodetector according to the first embodiment, and thus detailed descriptions thereof will be omitted.

Each of the signal processors described and illustrated in FIGS. 5 through 7 and FIG. 18 detects a push-pull signal as the track error signal TES using all the signals from the first through sixth receiving portions of the main photodetector 25 or 125. However, the track error signal can be detected using only signals output from some of the receiving portions. In the structures of a photodetector shown in FIGS. 5 through 7 and FIG. 20, to be later described, a track error signal can be detected using a signal other than the push-pull signal, for example, a phase difference signal.

FIG. 19 illustrates a main light spot $SP_{main}$ and a sub-light spot $SP_{sub}$, which are formed on a certain track of the optical disc 10 as a result of branching light emitted from the light source 11 of FIG. 3, into the main light beam I and the sub-light beam II using the hologram device 15. The main light spot $SP_{main}$ has no aberration, and the sub-light spot $SP_{sub}$ has optical aberration in the tangential direction of the optical disc 10.

Figure 20:
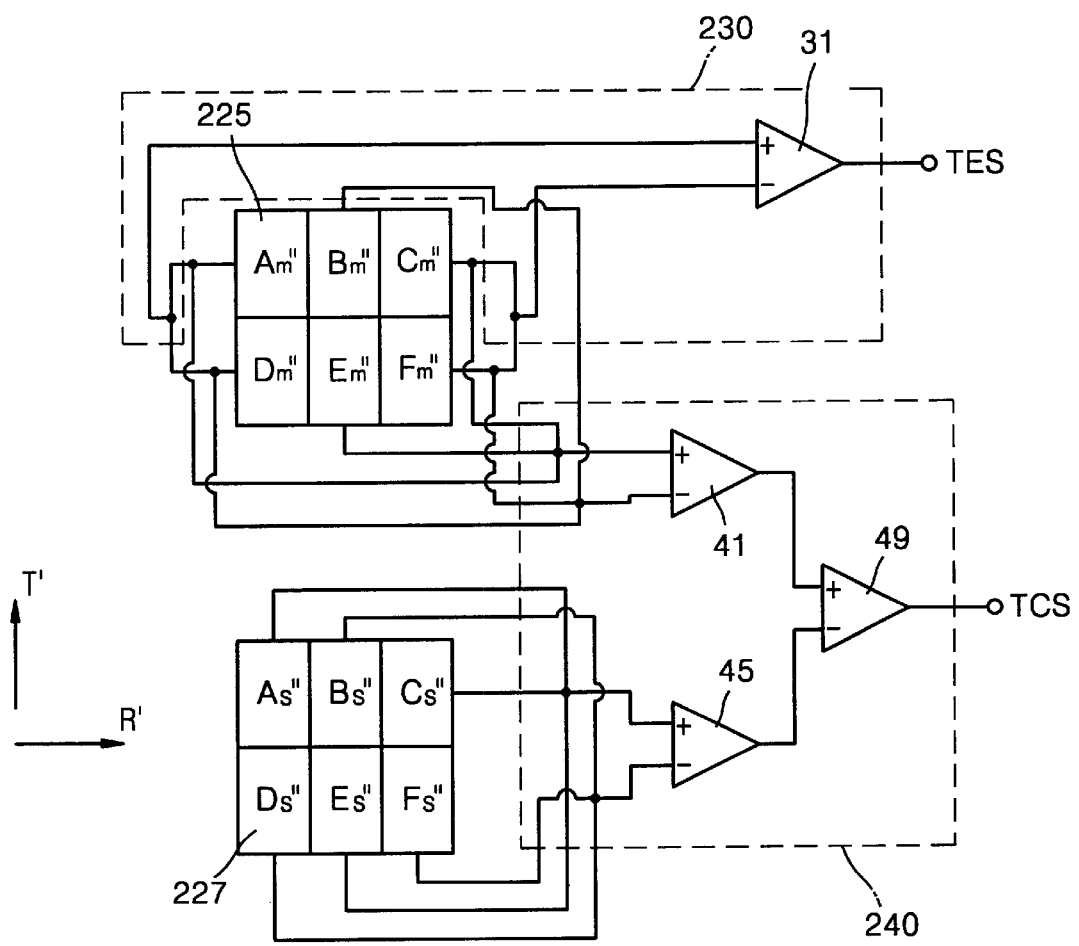
FIG. 20 is a schematic diagram illustrating the structure of a photodetector and a signal processor processing signals output from the photodetector, in accordance with an exemplary embodiment of the present invention.

FIG. 20 illustrates a third embodiment of a photodetector suitable for the case where the optical aberration of the sub-light spot $SP_{sub}$ is formed in the tangential direction of the optical disc 10, as shown in FIG. 19. The photodetector includes a main photodetector 225 for receiving main light beams I and a sub-photodetector 227 for receiving sub-light beams II.

The main photodetector 225 includes first through third receiving portions $A_m''$, $B_m''$, and $C_m''$ disposed in a direction R' corresponding to the radial direction of the optical disc 10. Receiving portions $D_m''$, $E_m''$, and $F_m''$ are disposed in the direction R' such that the fourth through sixth receiving portions $D_m''$, $E_m''$, and $F_m''$ are adjacent to the first through third receiving portions $A_m''$, $B_m''$, and $C_m''$, respectively, in a direction T' corresponding to the tangential direction of the optical disc 10.

The sub-photodetector 227 includes first through third receiving portions $A_s''$, $B_s''$, and $C_s''$ disposed in the direction R' corresponding to the radial direction of the optical disc 10 and fourth through sixth. The sub-photodetector 227 also includes receiving portions $D_s''$, $E_s''$, and $F_s''$ disposed in the direction R' such that the fourth through sixth receiving portions $D_s''$, $E_s''$, and $F_s''$ are adjacent to the first through third receiving portions $A_s''$, $B_s''$, and $C_s''$, respectively, in the direction T' corresponding to the tangential direction.

A track error signal detector 230 in a signal processor (not shown) detects the track error signal TES from signals output from some of the first through sixth receiving portions $A_m''$, $B_m''$, $C_m''$, $D_m''$, $E_m''$, and $F_m''$ of the main photodetector 225. Specifically, the track error signal detector 230 performs a differential operation on the sum of signals from the receiving portions $A_m''$ and $D_m''$ and the sum of signals from the receiving portions $C_m''$ and $F_m''$, thereby detecting the track error signal TES. Alternatively, the main photodetector 225 has an 8-division structure in which each of the second and fifth receiving portions $B_m''$ and $E_m''$ disposed in the middle of the main photodetector 225 in the direction R' corresponding to the radial direction is divided into two in the direction R'. The track error signal can be detected using the signals output from all the receiving portions of the main photodetector 225.

A track cross signal detector 240 of the signal processor detects a track cross signal TCS from signals output from the main photodetector 225 and the sub-photodetector 227. The first differential device 41 performs a differential operation between the sum of the signals from the first, third, and fifth receiving portions $A_m''$, $C_m''$, and $E_m''$, which are not adjacent to one another in the direction R' and in the direction T', and the sum of the signals from the second, fourth, and sixth receiving portions $B_m''$, $D_m''$, and $F_m''$, which are not adjacent to one another in the directions R' and T' in the main photodetector 225 and outputs a signal indicative thereof. The second differential device 45 performs a differential operation between the sum of the signals from the first, third and fifth receiving portions $A_s''$, $C_s''$, and $E_s''$, which are not adjacent to one another in the directions R' and T' in the sub-photodetector 227, and the sum of the signals from the second, fourth, and sixth receiving portions $B_s''$, $D_s''$, and $F_s''$, which are not adjacent to one another in the directions R' and T' in the sub-photodetector 227 and outputs a signal indicative thereof. The differential device 49 performs a differential operation between the output signals from the first differential device 41 and the second differential device 45, thereby detecting the track cross signal TCS.

For the track cross signal detector 240, one of the embodiments of the track cross signal detector 40 shown in FIGS. 5 through 7 can be employed. FIG. 20 illustrates employing the structure of FIG. 5 for the track cross signal detector 240. The track error signal TES and the track cross signal from the track error signal detector 230 and the track cross signal detector 240, respectively, can be digitized, as shown in FIG. 8, to detect a seek direction and discriminate between land and a groove.

In view of the apparatus for generating a seek direction detection signal, which is designed such that a sub-light spot $SP_{sub}$ has optical aberration in the tangential direction of the optical disc 10, according to the exemplary embodiments described in FIGS. 19 and 20, the characteristics of the track error signal detected by the track error signal detector 230, the track cross signal TCS detected by the track cross signal detector 240, and the signals $D_{TES}$ and $D_{TCS}$ obtained by digitizing the signals TES and TCS are similar to those of the signals shown in FIGS. 9 through 17, with the exception that the signals described with reference to FIGS. 19 and 20 correspond to optical aberration in the tangential direction with a tangential tilt.

In accordance with FIGS. 9 through 17, the apparatus for generating a seek direction detection signal is designed such that a sub-light spot $SP_{sub}$ has an optical aberration in the tangential direction of the optical disc 10, with reference to FIGS. 19 and 20, and can generate a seek direction detection signal, a relative position detection signal, and a land/groove discrimination signal. Likewise, the apparatus for generating a seek direction detection signal, according to FIGS. 4 through 18, is designed such that a sub-light spot $SP_{sub}$ has optical aberration in the radial direction of the optical disc 10.

As illustrated in FIGS. 4 and 19, the apparatus for generating a seek direction detection signal is described by presenting examples where the main photodetector 25, 125 or 225, the sub-photodetector 27, 127 or 227 and the signal processor are prepared to be suitable for the disposition of a sub-light spot $SP_{sub}$. Accordingly, the phase of the signal output from the track cross signal detector 40, 140 or 240 may be inverted when a sub-light spot leads a main light spot, one of a pair of sub-light spots leads a main light spot and the other follows the main light spot, or the direction of optical aberration of a sub-light spot changes. Such an inverted phase can be corrected by changing the position of an input port of a differential device by using an inverter, and thus a detailed description thereof will be omitted.

As described above, the apparatus for generating a seek direction detection signal in an optical pickup according to the present invention may be employed in a system for RAM type optical discs having a land and groove structure, particularly, in a system for HD-DVD RAM type optical discs.

The apparatus for generating a seek direction detection signal in accordance with the present invention, has a structure in which a main light spot and a sub-light spot have a predetermined amount of optical aberration in the radial or tangential direction of an optical disc and are formed on a certain track on the optical disc having a land and groove structure. Therefore, the present invention can overcome the problem of cross-erasure caused by using first and second sub-light beams displaced from a main light beam by ±½ track pitch in a conventional system.

In addition, the apparatus for generating a seek direction detection signal in accordance with the present invention can generate a seek direction detection signal for a light spot and a relative position detection signal between the center of the light spot and the center of a certain track on an optical disc by comparing a track error signal and a track cross signal, even when a sub-light spot $SP_{sub}$ has optical aberration corresponding to a tilt smaller than the tilt (for example, the radial tilt of ±0.35°) of the optical disc which is a basic tilt in a typical system. Because the sub-light spot $SP_{sub}$ has such small optical aberration, a signal having a large signal-to-noise (S/N) ratio can be detected. Moreover, the apparatus according to the present invention can generate a land/groove discrimination signal from the track cross signal.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An apparatus for use with an optical disc:
   an optical branching unit irradiating a main light beam and a sub-light beam, wherein the sub-light beam comprises an optical aberration in a direction on a track of the optical disc;
   a photodetector comprising a plurality of portions receiving and processing the main light beam and a plurality of portions receiving and processing the sub-light beam;
   a track error signal detector detecting a track error signal from the portions receiving the main light beam;
   a track cross signal detector detecting a track cross signal from the portions receiving the main light beam and from the portions receiving the sub-light beam; and
   a signal processor comparing the track error signal with the track cross signal to detect a seek direction of a light spot formed on the optical disc.

2. The apparatus as recited in claim 1, wherein the optical aberration of the sub-light beam comprises optical aberration in the radial or tangential direction of the optical disc.

3. The apparatus as recited in claim 1, wherein the signal processor further detects the seek direction and relative positions of a center of the light spot and a center of the track on the optical disc, using a phase difference between the track error signal and the track cross signal.

4. The apparatus as recited in claim 1, wherein the photodetector comprises a main photodetector comprising the plurality of receiving portions receiving and photoelectrically converting the main light beam reflected from the optical disc, and a sub-photodetector comprising the plurality of receiving portions receiving and photoelectrcially converting the sub-light beam reflected from the optical disc.

5. An apparatus for use with an optical disc:

a light source;

an optical branching unit branching incident light into a main light beam and a sub-light beam, forming a main light spot and a sub-light spot, the sub-light spot comprising optical aberration in a radial or tangential direction of the optical disc;

a main photodetector comprising a plurality of receiving portions receiving and photoelectrically converting the main light beam reflected from the optical disc;

a sub-photodetector comprising a plurality of receiving portions receiving and photoelectrically converting the sub-light beam reflected from the optical disc;

a track error signal detector detecting a track error signal from the receiving portions of the main photodetector;

a track cross signal detector processing output signals from the receiving portions of the main photodetector and from the receiving portions of the sub-photodetector to detect a track cross signal; and a signal processor comparing the track error signal with the track cross signal to detect a seek direction.

6. The apparatus of claim 5, wherein the sub-light spot comprises optical aberration in the radial direction of the optical disc, each of the main and sub-photodetectors comprises first through third receiving portions, which are not adjacent to one another, disposed in a direction corresponding to the tangential direction of the optical disc, and fourth through sixth receiving portions disposed in the direction corresponding to the tangential direction of the optical disc, wherein the fourth through sixth receiving portions are adjacent to the first through third receiving portions, respectively, in the direction corresponding to the radial direction of the optical disc, and the track cross signal detector processes first signals from two of the first, third and fifth receiving portions, and second signals from two of the second, fourth and sixth receiving portions to detect the track cross signal.

7. The apparatus of claim 6, wherein the track cross signal detector comprises:

a first differential device performing a differential operation on a sum of the first signals and a sum of the second signals to detect a first differential signal, the first and second signals being output from the main photodetector;

a second differential device performing a differential operation on the sum of the first signals and the sum of the second signals to detect a second differential signal, the first and second signals being output from the sub-photodetector; and a third differential device performing a differential operation on the first and second differential signals to detect a track cross signal.

8. The apparatus of claim 7, wherein the track cross signal detector further comprises:

a first gain controller applying a predetermined gain k1 to signals output from the second and fifth receiving portions of the main photodetector; and a second gain controller applying a predetermined gain k2 to signals output from the second and fifth receiving portions of the sub-photodetector.

9. The apparatus of claim 7, wherein the track cross signal detector further comprises a gain controller applying a predetermined gain to the first differential signal and outputting a result signal to the third differential device.

10. The apparatus of claim 6, wherein the track cross signal detector applies a predetermined gain k1 to signals output from the second and fifth receiving portions of the main photodetector and applies a predetermined gain k2 to signals output from the second and fifth receiving portions of the sub-photodetector.

11. The apparatus of claim 6, wherein the track cross signal detector applies a predetermined gain to a signal output from the main photodetector.

12. The apparatus of claim 5, wherein the sub-light spot comprises optical aberration in the radial direction of the optical disc, each of the main and sub-photodetectors comprises first through sixth receiving portions disposed in the direction corresponding to the radial direction of the optical disc, and the track cross signal detector processes first signals from two of the first, third, and fifth receiving portions, which are not adjacent to one another, and second signals from two of the second, fourth, and sixth receiving portions in each of the main and sub-photodetectors to detect the track cross signal.

13. The apparatus of claim 12, wherein the track cross signal detector comprises:

a first differential device performing a differential operation on a sum of the first signals and a sum of the second signals to detect a first differential signal, the first and second signals being output from the main photodetector;

a second differential device performing a differential operation on the sum of the first signals and the sum of the second signals to detect a second differential signal, the first and second signals being output from the sub-photodetector; and a third differential device performing a differential operation on the first and second differential signals to detect a track cross signal.

14. The apparatus of claim 13, wherein the track cross signal detector further comprises:

a first gain controller applying a predetermined gain k1 to signals output from the second and fifth receiving portions of the main photodetector; and a second gain controller applying a predetermined gain k2 to signals output from the second and fifth receiving portions of the sub-photodetector.

15. The apparatus of claim 13, wherein the track cross signal detector further comprises a gain controller applying a predetermined gain to the first differential signal and outputting a result signal to the third differential device.

16. The apparatus of claim 12, wherein the track cross signal detector applies a predetermined gain to a signal output from the main photodetector.

17. The apparatus of claim 12, wherein the track cross signal detector applies a predetermined gain k1 to signals output from the second and fifth receiving portions of the main photodetector and applies a predetermined gain k2 to signals output from the second and fifth receiving portions of the sub-photodetector.

18. The apparatus of claim 5, wherein the sub-light spot comprises optical aberration in the tangential direction of the optical disc, each of the main and sub-photodetectors comprises first through third receiving portions disposed in a direction corresponding to the radial direction of the optical disc, and fourth through sixth receiving portions disposed in the direction corresponding to the radial direction of the optical disc, wherein the fourth through sixth receiving portions are adjacent to the first through third receiving portions, respectively, in the direction corresponding to the tangential direction, and the track cross signal detector processes first signals from two of the first, third, and fifth receiving portions, which are not adjacent to one another, and second signals from two of the second, fourth, and sixth receiving portions in each of the main and sub-photodetectors to detect the track cross signal.

19. The apparatus of claim 18, wherein the track cross signal detector comprises:

a first differential device performing a differential operation on a sum of the first signals and a sum of the second signals to detect a first differential signal, the first and second signals being output from the main photodetector;

a second differential device performing a differential operation on the sum of the first signals and the sum of the second signals to detect a second differential signal, the first and second signals being output from the sub-photodetector; and a third differential device performing a differential operation on the first and second differential signals to detect a track cross signal.

20. The apparatus of claim 19, wherein the track cross signal detector further comprises:

a first gain controller applying a predetermined gain k1 to signals output from the second and fifth receiving portions of the main photodetector; and a second gain controller applying a predetermined gain k2 to signals output from the second and fifth receiving portions of the sub-photodetector.

21. The apparatus of claim 19, wherein the track cross signal detector further comprises a gain controller applying a predetermined gain to the first differential signal and outputting a result signal to the third differential device.

22. The apparatus of claim 18, wherein the track cross signal detector applies a predetermined gain to a signal output from the main photodetector.

23. The apparatus of claim 18, wherein the track cross signal detector applies a predetermined gain k1 to signals output from the second and fifth receiving portions of the main photodetector and applies a predetermined gain k2 to signals output from the second and fifth receiving portions of the sub-photodetector.

24. The apparatus of claim 5, wherein the signal processor further comprises a digitizer digitizing the track error signal and the track cross signal to detect the seek direction by comparing the digitized track error signal with the digitized track cross signal.

25. The apparatus of claim 5, wherein the signal processor discriminates land from a groove based on the track cross signal output from the track cross signal detector.

26. The apparatus of claim 25, wherein the signal processor further comprises a digitizer digitizing the track cross signal to discriminate a land from a groove based on the digitized track cross signal.

27. The apparatus of claim 5, wherein signal processor further comprises a digitizer digitizing the track cross signal to discriminate a land from a groove based on the digitized track cross signal.

28. The apparatus of claim 5, wherein the signal processor comprises the track error signal detector and the track cross signal detector.

29. The apparatus of claim 5, wherein a photodetector comprises the main photodetector and the sub-photodetector.

30. The apparatus of claim 5, wherein the track cross signal has a phase difference of 90° with respect to the track error signal.

31. An apparatus for use with an optical disc:

optical branching means for irradiating a main light beam and a sub-light beam, wherein the sub-light beam comprises an optical aberration in a direction on a track of the optical disc;

photodetecting means comprising a plurality of portions for receiving and processing the main light beam and a plurality of portions receiving and processing the sub-light beam;

track error signal detecting means for detecting a track error signal from the portions receiving the main light beam;

track cross signal detecting means for detecting a track cross signal from the portions receiving the main light beam and from the portions receiving the sub-light beam; and signal processing means for comparing the track error signal with the track cross signal to detect a seek direction of a light spot formed on the optical disc.

32. An apparatus for use with an optical disc:

a light source;

optical branching means for branching incident light into a main light beam and a sub-light beam, forming a main light spot and a sub-light spot, the sub-light spot comprising optical aberration in a radial or tangential direction of the optical disc;

main photodetecting means comprising a plurality of receiving portions for receiving and photoelectrically converting the main light beam reflected from the optical disc;

sub-photodetecting means comprising a plurality of receiving portions for receiving and photoelectrically converting the sub-light beam reflected from the optical disc;

track error signal detecting means for detecting a track error signal from the receiving portions of the main photodetector;

track cross signal detecting means for processing output signals from the receiving portions of the main photodetector and from the receiving portions of the sub-photodetector to detect a track cross signal; and signal processing means for comparing the track error signal with the track cross signal to detect a seek direction.

* * * * *